B. F. HAYWARD.
HEN'S NEST.
No. 82,312. Patented Sept. 22, 1868.
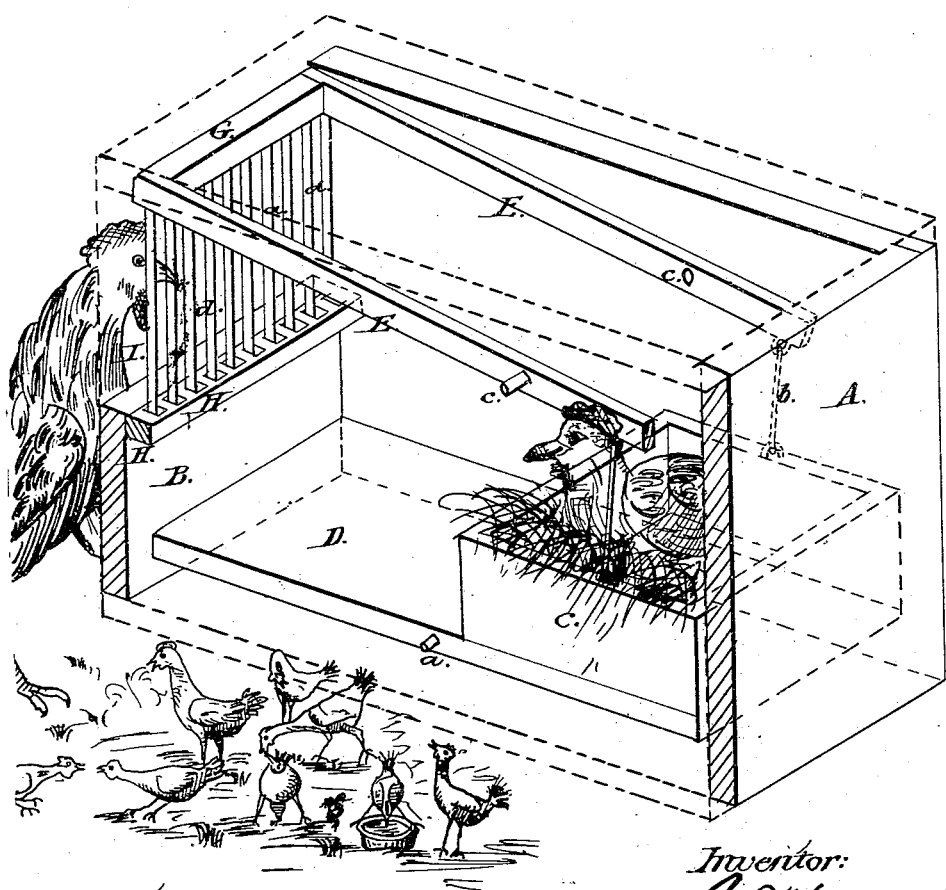

United States Patent Office.

B. F. HAYWARD, OF NEBRASKA CITY, NEBRASKA.

Letters Patent No. 82,312, dated September 22, 1868.

---

IMPROVEMENT IN HENS' NESTS.

---

The Schedule referred to in these Letters Patent and making part of the same.

---

TO ALL WHOM IT MAY CONCERN:

Be it known that I, B. F. HAYWARD, of Nebraska City, in the county of Otoe, and State of Nebraska, have invented a new and useful Improvement in Nest-Boxes for Hens; and I do hereby declare that the following is a full, clear, and exact description thereof, which will enable others skilled in the art to make and use the same, reference being had to the accompanying drawings, forming part of this specification, in which—

The drawing shows a perspective view of my improved nest-box, with the side removed to show the construction.

Similar letters of reference indicate like parts.

The object of this invention is to provide a nest-box, which will close automatically when the hen gets upon her nest, and will open in the same manner when the fowl wishes to leave her nest, whereby a setting hen may be protected from annoyance from other fowls, or other animals prone to annoy hens while hatching or laying.

It consists of a box, A, having one end half closed by a board, B, and provided with a nest-box, C, affixed to a pivoted bottom-board, D, vibrating on a wire rod or stud, $d$, having its bearings in the sides of the box.

The nest-box is connected, by means of links $b$, shown in dotted lines, with two levers E, pivoted to the inner side of the box, as shown at $c$. A cross-piece, G, unites the ends of the levers, and is provided with wire rods $d\ d\ d$, &c., forming a grating, which, from the weight of the parts in front of the pivots $c$, falls, as shown in the drawings, leaving the entrance to the box open.

The grate-rods enter the holes in the strip H, affixed to the board B, as shown.

The operation of this invention is as follows:

When the hen gets upon the nest in the nest-box, the weight of the fowl causes the long arms of the levers to be raised, (the parts being proportioned with that object,) which brings the grate-rods up, thus closing the entrance I, and excluding the other fowls, or such animals as are liable to give annoyance to the setting fowl.

When the fowl attempts to leave the nest, she will instinctively proceed toward the lighted entrance, and, in so doing, her weight will be transferred to the bottom-board D, in a part of the pivot $a$ which will cause the grating to fall, and thus permit her egress.

The lid of the box A is hinged, for the purpose of rendering the nest-box conveniently accessible to any person wishing to gather the eggs.

The stud-pin $e$ limits the downward movement of the forward end of the bottom-board.

Having thus described my invention, I claim as new, and desire to secure by Letters Patent—

The nest-box C, pivoted bottom-board D, link $b$, levers E, and grating $d$, all constructed and operating substantially as described, within a box, A, all as set forth.

B. F. HAYWARD.

Witnesses:
L. M. LLOYD,
C. W. PIERCE.